(12) United States Patent
Ueno

(10) Patent No.: US 10,975,796 B2
(45) Date of Patent: Apr. 13, 2021

(54) FUEL INJECTION APPARATUS

(71) Applicant: Honda Motor Co., Ltd., Tokyo (JP)

(72) Inventor: Kazuki Ueno, Wako (JP)

(73) Assignee: Honda Motor Co., Ltd.

( * ) Notice: Subject to any disclaimer, the term of this patent is extended or adjusted under 35 U.S.C. 154(b) by 0 days.

(21) Appl. No.: 16/747,391

(22) Filed: Jan. 20, 2020

(65) Prior Publication Data

US 2020/0240349 A1    Jul. 30, 2020

(30) Foreign Application Priority Data

Jan. 25, 2019    (JP) .............................. JP2019-010720

(51) Int. Cl.
| | |
|---|---|
| *F02B 3/00* | (2006.01) |
| *F02D 41/30* | (2006.01) |
| *F02M 69/54* | (2006.01) |
| *F02M 65/00* | (2006.01) |

(52) U.S. Cl.
CPC ..... *F02D 41/3017* (2013.01); *F02D 41/3005* (2013.01); *F02M 65/008* (2013.01); *F02M 69/54* (2013.01); *F02D 2200/0602* (2013.01)

(58) Field of Classification Search
CPC ... F02D 41/402; B05B 15/555; B05B 15/557; B08B 5/02; B08B 9/032; B08B 9/0321; B08B 9/0327; B08B 9/0328; B08B 9/0495
USPC .............. 123/299; 239/533.12, 533.2, 533.3; 134/22.1, 22.12
See application file for complete search history.

(56) References Cited

U.S. PATENT DOCUMENTS

| | | | | |
|---|---|---|---|---|
| 5,845,225 | A | * 12/1998 | Mosher | F02B 77/04 |
| | | | | 701/102 |
| 9,200,561 | B2 | * 12/2015 | McAlister | F02B 43/00 |
| 2006/0272618 | A1 | * 12/2006 | Iwahashi | F02D 41/38 |
| | | | | 123/458 |
| 2016/0245221 | A1 | * 8/2016 | McEwan | F02D 41/40 |

FOREIGN PATENT DOCUMENTS

JP        2016003570 A     1/2016

\* cited by examiner

*Primary Examiner* — John Kwon
(74) *Attorney, Agent, or Firm* — Duft & Bornsen, PC

(57) ABSTRACT

A fuel injection apparatus for injecting fuel to an engine having cylinders, includes: injectors corresponding to the cylinders; a regulator for fuel pressure supplied to the injectors; and a processor. The processor performs: deciding to start a deposit removal for removing deposits adhering to injector-nozzles; and controlling each injector to inject fuel in a single injection mode for injecting one time or a divided injection mode for injecting multiple times in one combustion cycle and control the regulator based on engine operation condition. The controlling includes, when controlling each injector to inject fuel in the divided injection mode based on the engine operation condition, sequentially controlling each injector to reduce injection number in one combustion cycle when the deposit removal is decided to be started, and then controlling the regulator to increase fuel pressure.

15 Claims, 5 Drawing Sheets

FUEL INJECTION APPARATUS

CROSS-REFERENCE TO RELATED APPLICATION

This application is based upon and claims the benefit of priority from Japanese Patent Application No. 2019-010720 filed on Jan. 25, 2019, the content of which is incorporated herein by reference.

BACKGROUND OF THE INVENTION

Field of the Invention

This invention relates to a fuel injection apparatus configured to inject fuel to an internal combustion engine having multiple cylinders.

Description of the Related Art

As this type of apparatus, there have been known ones configured to remove deposits adhering to nozzles of fuel injection valves. Such an apparatus is described in, for example, Japanese Unexamined Patent Application Publication No. 2016-003570 (JP2016-003570A). In the case of the apparatus of JP2016-003570A, when it determined that the deposits are adhering to the nozzles of the fuel injection valves, fuel injection pressure is increased compared to when it is determined that no deposits are adhering, as well as the number of times of fuel injection per one operation cycle is reduced to, for example, one time from multiple times.

However, in the case of the apparatus of JP2016-003570A, total amount of fuel injection per one operation cycle may increase while reducing the number of times of fuel injection for all of cylinders and thus the actual air-fuel ratio may deviate from the target air-fuel ratio.

SUMMARY OF THE INVENTION

An aspect of the present invention is a fuel injection apparatus configured to inject fuel to an internal combustion engine having a plurality of cylinders. The fuel injection apparatus includes: a plurality of fuel injectors disposed corresponding to the plurality of cylinders; a pressure regulator configured to regulate a pressure of fuel supplied to the plurality of fuel injectors; and an electronic control unit having a processor and a memory connected to the processor. The processor is configured to perform: deciding to start a deposit removal operation for removing deposits adhering to nozzles of the plurality of fuel injectors; and controlling each of the plurality of fuel injectors to inject fuel in one of a single injection mode for injecting fuel one time in one combustion cycle and a divided injection mode for injecting fuel multiple times in one combustion cycle and control the pressure regulator based on an operation condition of the internal combustion engine. The processor is configured to perform: the controlling including, when controlling each of the plurality of fuel injectors to inject fuel in the divided injection mode based on the operation condition of the internal combustion engine, sequentially controlling each of the plurality of fuel injectors to reduce a number of injection in one combustion cycle when the deposit removal operation is decided to be started, and then controlling the pressure regulator to increase the pressure of fuel.

Another aspect of the present invention is a fuel injection method for injecting fuel to an internal combustion engine having a plurality of cylinders, a plurality of fuel injectors disposed corresponding to the plurality of cylinders, and a pressure regulator configured to regulate a pressure of fuel supplied to the plurality of fuel injectors. The fuel injection method includes: deciding to start a deposit removal operation for removing deposits adhering to nozzles of the plurality of fuel injectors; and controlling each of the plurality of fuel injectors to inject fuel in one of a single injection mode for injecting fuel one time in one combustion cycle and a divided injection mode for injecting fuel multiple times in one combustion cycle and control the pressure regulator based on an operation condition of the internal combustion engine. The controlling including, when controlling each of the plurality of fuel injectors to inject fuel in the divided injection mode based on the operation condition of the internal combustion engine, sequentially controlling each of the plurality of fuel injectors to reduce a number of injection in one combustion cycle when the deposit removal operation is decided to be started, and then controlling the pressure regulator to increase the pressure of fuel.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 5. A fuel injection apparatus according to the embodiment of the present invention is applied to an engine which is a spark-ignition internal combustion engine. The engine is a four-cycle engine that undergoes four strokes of an intake stroke, an expansion stroke, a compression stroke and an exhaust stroke in one operation cycle. For example, the engine has multiple cylinders, for example, four cylinders or six cylinders.

Figure 1:
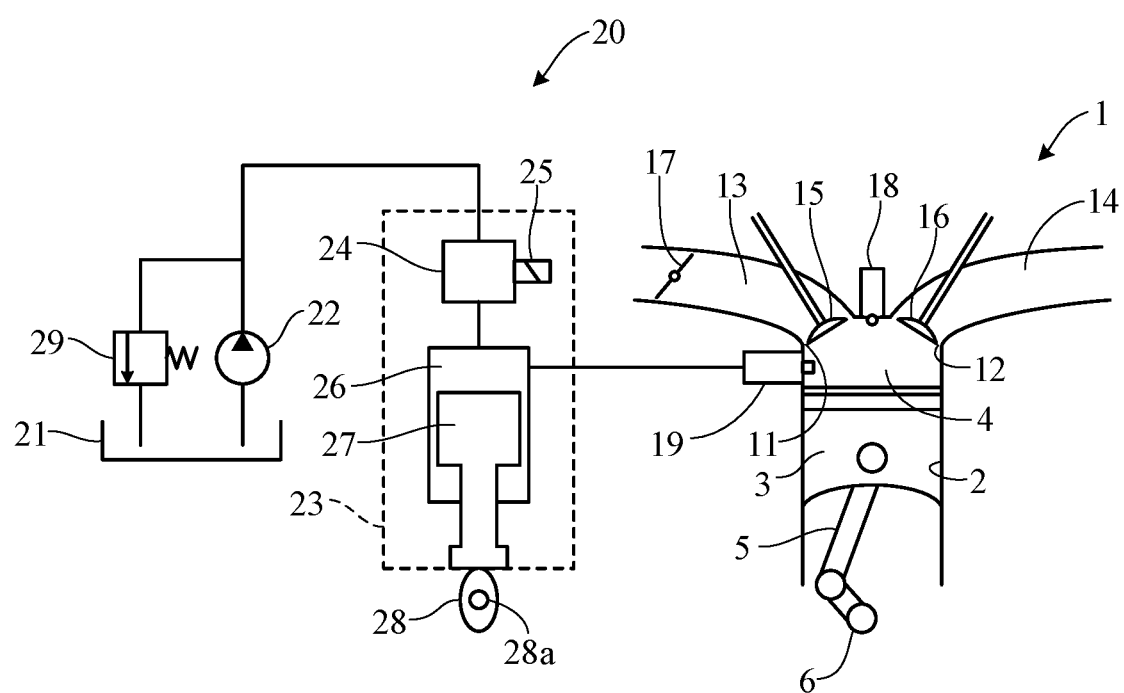
FIG. 1 is a diagram schematically showing a major-part configuration of an engine having a fuel injection apparatus according to an embodiment of the present invention.

FIG. 1 is a drawing schematically showing the configuration of main components of an engine 1 having the fuel injection apparatus according to the present embodiment. FIG. 1 shows the configuration of one of multiple cylinders. As shown in FIG. 1, the engine 1 has cylinders 2 formed in a cylinder block, pistons 3 respectively disposed slidably in the cylinders 2, and combustion chambers 4 respectively formed between the pistons 3 and a cylinder head. Each piston 3 is connected to a crankshaft 6 through connecting rods 5. Reciprocation of the piston 3 along the inner wall of the cylinder 2 causes rotation of the crankshaft 6. The crankshaft 6 rotates two times in one operation cycle of the cylinder 2.

The cylinder head is provided with intake ports 11 and exhaust ports 12. An intake passage 13 communicates with each of the combustion chambers 4 through the intake ports 11, while an exhaust passage 14 communicates with each of the combustion chambers 4 through the exhaust ports 12. The intake ports 11 are respectively opened and closed by intake valves 15, and the exhaust ports 12 are respectively opened and closed by exhaust valves 16. A throttle valve 17 is disposed in the intake passage 13 on an upstream side of the intake valve 15. The throttle valve 17 s configured as, for example, a butterfly valve. An amount of intake air (intake air amount) supplied to the combustion chambers 4 can be regulated by the throttle valve 17. The intake valves 15 and the exhaust valves 16 are driven by a valve mechanism (not shown) to be opened/closed at a predetermined timing synchronous with the rotation of the crankshaft 6.

Ignition plugs 18 and injectors 19 for direct injection are mounted on one of the cylinder head and the cylinder block so as to respectively face the combustion chambers 4. The ignition plug 18 is disposed between the intake port 11 and the exhaust port 12. The ignition plug 18 produces a spark by electrical energy to ignite a mixture of fuel and air in the combustion chamber 4. The injector 19 is disposed on a side wall of the cylinder block near the intake valve 15. The injector 19 is driven by electrical energy to inject the fuel into the combustion chamber 4. Specifically, the injector 19 is configured as a fuel injection valve of a cylinder-injection type. The injector 19 can be disposed otherwise, for example, disposed near the ignition plug 18. The injector 19 is driven by, for example, a piezo-actuator, and has high responsiveness.

The injector 19 injects the fuel one time or multiple times in one cycle based on operation condition of the engine 1. For example, the injector 19 injects the fuel one time in the intake stroke, two times in the intake stroke, or three times in the intake stroke. Hereinafter, an injection mode to inject the fuel one time in the intake stroke (single injection) is referred to as a "single injection mode", and an injection mode to inject the fuel two times or three times in the intake stroke (divided injection) is referred to as a "divided injection mode". In a same operation condition, a fuel injection amount per one injection in the divided injection mode is smaller than that in the single injection mode. For example, assuming that total fuel injection amounts per one cycle in the single injection mode and the divided injection mode are the same, the fuel injection amount per one injection in the divided injection mode is smaller than in the single injection mode.

The injectors 19 are supplied with the fuel from a fuel supplier 20. The fuel supplier 20 has a low-pressure pump 22 that sucks the fuel stored in a fuel tank 21, and high-pressure pumps 23 that increase pressure of the fuel sucked by the low-pressure pump 22. The fuel, pressure of which is increased to a target pressure by the high-pressure pumps 23, is supplied to each of the injectors 19.

The high-pressure pump 23 has a valve mechanism 24, and a plunger 27 that reciprocates (vertically moves) in a compression chamber 26. The valve mechanism 24 is disposed between the low-pressure pump 22 and the compression chamber 26 and is configured as an open/close valve that is driven by a pump solenoid 25 to be opened/closed. An end of the plunger 27 abuts on a peripheral surface of a cum 28 that rotates around a cum shaft 28a in synchronization with rotation of the crankshaft 6. The plunger 27 is vertically moved by rotation of the cum 28. An upward movement of the plunger 27 reduces the volume of the compression chamber 26 and a downward movement of the plunger 27 increases the volume of the compression chamber 26. A discharge-side pipe of the low-pressure pump 22 is connected to a regulator 29. The fuel, pressure of which is regulated by the regulator 29, is supplied to the compression chamber 26 through the valve mechanism 24.

When the valve mechanism 24 is closed, pressure of the fuel supplied into the pressure chamber 26 is increased by the upward movement of the plunger 27. The fuel, pressure of which is increased, is introduced to each of the injectors 19. With this, it becomes possible to instantly increase the fuel pressure to the target pressure, as well as to regulate the fuel pressure to the predetermined target pressure by controlling open/close of the valve mechanism 24 by driving the pump solenoid 25. On the other hand, when the valve mechanism 24 is opened, pressure of the fuel in the pressure chamber 26 is turned to the fuel tank 21 through the regulator 29 by the upward movement of the plunger 27.

In the above configuration, deposits (carbon, etc.) may adhere to and accumulate in the vicinity of a nozzle on a tip portion of the injector 19. Accumulated deposits may change injection characteristics of the injectors 19 to make it difficult to accurately inject desired fuel amount, thereby degrading controllability of the engine 1. Therefore, in the present embodiment, the fuel pressure is increased and the fuel is injected in the single injection mode to remove the accumulated deposits. With this, the accumulated deposits can be blown off by the fuel. Hereinafter, a mode in which the fuel is injected to remove the accumulated deposits, i.e., a mode in which the fuel pressure is increased and the fuel is injected in the single injection mode, is referred to as a "cleaning mode."

In the engine 1 having the multiple cylinders, such as in the present embodiment, a fuel injection timing varies among the cylinders. Since the injection modes are switched sequentially for each cylinder, it takes a predetermined time period (for example, a time corresponding to one cycle) to change from a state in which the injectors 19 of all of the cylinders are in the divided injection mode to a state in which the injectors 19 of all of the cylinders are in the single injection mode. In other words, a time lag arises from a stat of the cleaning mode until the cleaning mode becomes complete state. If the cleaning mode is started during the divided injection mode without considering the above, fuel pressure of some injectors 19 may increase before switching to the single injection mode, i.e., before completing the divided injection mode. As a result, amount of fuel injected from the some injectors 19 may increase and thus the actual air-fuel ratio may greatly deviate from the target value (target air-fuel ratio). To suppress such deviation of the air-fuel ratio in executing the cleaning mode, the fuel injection apparatus according to the present embodiment is configured as follows.

Figure 2:
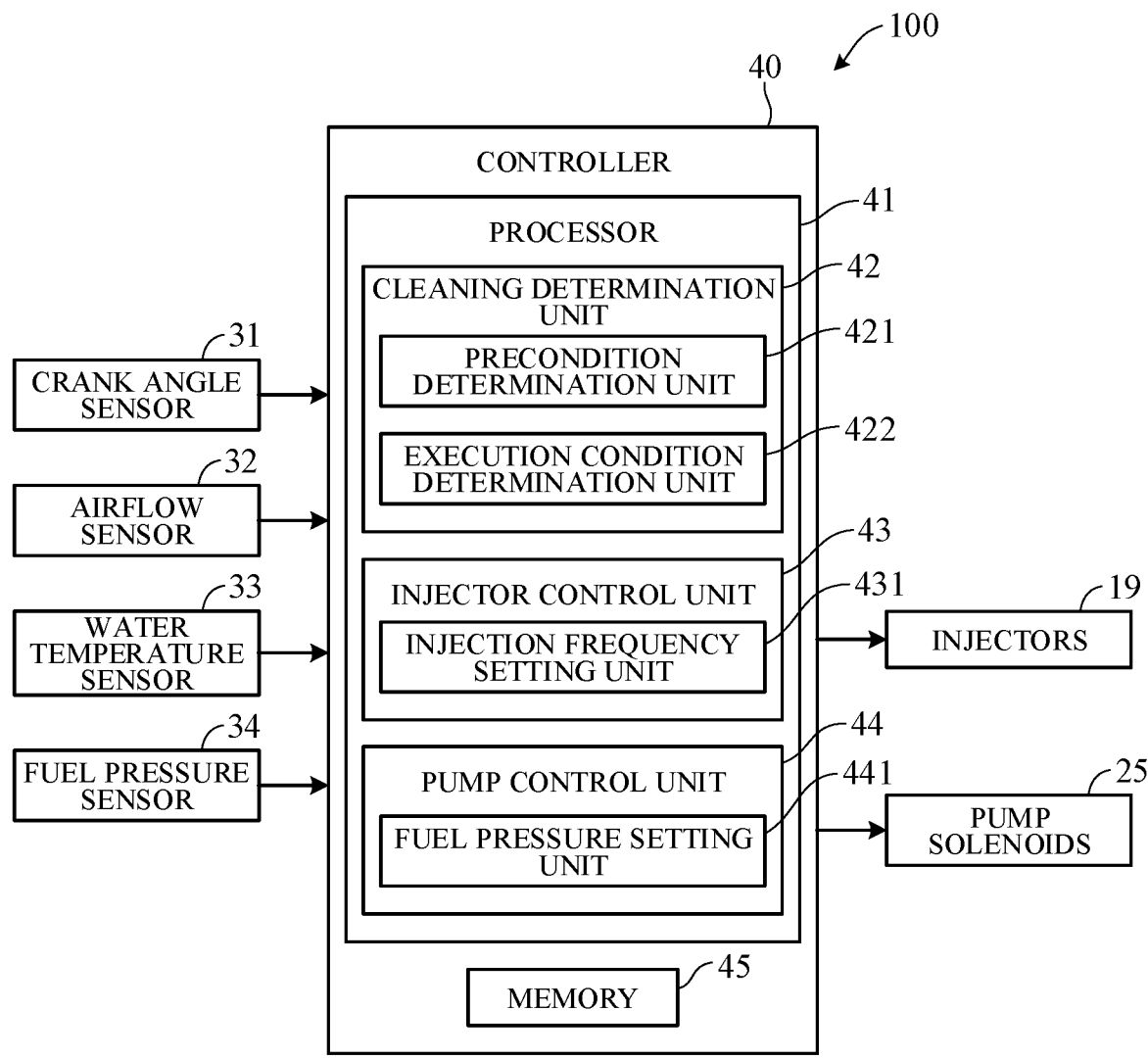
FIG. 2 is a block diagram showing a major-part configuration of the fuel injection apparatus according to the embodiment of the present invention.

FIG. 2 is a block diagram showing a major-part configuration of a fuel injection apparatus 100 according to the embodiment of the present invention. As shown in FIG. 2, the fuel injection apparatus 100 is configured centered on a controller 40 for controlling fuel injection and includes the controller 40, various types of sensors and actuators connected to the controller 40, and the like. Specifically, a crank angle sensor 31, an airflow sensor 32, a water temperature sensor 33, a fuel pressure sensor 34, the injectors 19 (to be exact, actuators for driving the injectors 19), and pump solenoids 25 are connected to the controller 40.

The crank angle sensor 31 is disposed on the crankshaft 6 and configured to output pulse signals in association with rotation of the crankshaft 6. The controller 40 calculates the engine speed on the basis of the pulse signals from the crank angle sensor 31, as well as identifies the time point at which the piston 3 of each cylinder is located in a predetermined crank angle position near the top dead center (TDC) at the start of the intake stroke.

The airflow sensor 32 is disposed on the intake passage 13, and the intake air amount drawn into the cylinders 2 is detected on the basis of signals from the airflow sensor 32. The water temperature sensor 33 is disposed on a circulation passage for circulating cooling water of the engine 1, and temperature of the engine cooling water (engine water temperature) is detected on the basis of signals from the water temperature sensor 33. The fuel pressure sensor 34 is disposed in a fuel supply passage on a downstream side of the high-pressure pump 23, and the fuel pressure supplied to each injector 19 is detected on the basis of signals from the fuel pressure sensor 34. The fuel pressure sensor 34 functions as a pressure detector.

The controller 40 is configured as an electronic control unit (ECU) including a computer that has a processor 41, such as a CPU, a memory 45, such as a ROM or RAM, and other peripheral circuits, such as an I/O interface. Various types of characteristic maps, threshold values, control programs and the like are stored in the memory 45 in advance. The controller 40 outputs controls signals to the injectors 19 and pump solenoids 25 on the basis of signals from the sensors 31 to 34.

The processor 41 has, as functional elements, a cleaning determination unit 42 that determines whether the cleaning mode should be executed, an injector control unit 43 that controls the injectors 19, and a pump control unit 44 that controls the pump solenoids 25.

The cleaning determination unit 42 has a precondition determination unit (first determination unit) 421 and an execution condition determination unit (second determination unit) 422. The cleaning determination unit 42 determines that the cleaning mode should be executed when it is determined by the precondition determination unit 421 that a precondition (first condition) for executing the cleaning mode is satisfied and it is determined by the execution condition determination unit 422 that an execution condition (second condition) for executing the cleaning mode is satisfied. On the other hand, the cleaning determination unit 42 determines that the cleaning mode should not be executed when it is determined that one of the precondition and the execution condition is not satisfied.

The precondition determination unit 421 determines whether the precondition is satisfied so as to determine whether a periodical cleaning (deposits removal) of the injectors 19 is needed. The precondition is satisfied when the engine 1 starts, as well as satisfied every time when a predetermined amount of fuel has been consumed after the cleaning mode has been completed. After the precondition has been satisfied, the precondition turns to be unsatisfied when the cleaning mode has been continuously executed for a predetermined time period. Specifically, the precondition turns to be unsatisfied since deposits adhering in the vicinity of nozzles do not seem to reach a level to be removed.

The execution condition determination unit 422 determines whether the execution condition is satisfied so as to determine whether the operation condition is one in which the cleaning mode can be effectively executed. The execution condition is satisfied when the engine water temperature Tw is equal to or greater than a predetermined value Tw1 corresponding to a temperature after warming-up; the intake air amount Ga into the cylinders 2 is equal to or greater than a predetermined value Ga1; the engine speed Ne is equal to or greater than a predetermined value Ne1; and the fuel pressure Pf is smaller than a predetermined value Pf1. The predetermined value Pf1 corresponds to the minimum fuel pressure that can contribute to removal of deposits. Specifically, the execution condition is not satisfied when the fuel pressure Pf is equal to or greater than the predetermined value Pf1, because deposits can be removed without further increasing the fuel pressure Pf. A cleaning pressure Pf2 (second predetermined value), which is the target fuel pressure in the cleaning mode, is a fuel pressure that allows for sufficient removal of deposits and is set to a higher value than the predetermined value Pf1 (first predetermined value) (see FIG. 5).

The injector control unit 43 has an injection frequency setting unit 431 that sets the target injection frequency (injection mode) of the injectors 19 in the intake stroke. The injector control unit 43 outputs control signals to the injectors 19 so that the injectors 19 inject the fuel at a predetermined timing with the target injection frequency. The injection frequency setting unit 431 first determines a reference injection frequency corresponding to the operation condition using an injection characteristic map or the like indicating injection characteristics stored in the memory 45 in advance. For example, the injection characteristic map is a characteristic map using the engine speed Ne and the intake air amount Ga as parameters and showing that the single injection is executed in area of smaller intake air amount Ga for a certain engine speed Ne and that the divided injection is executed in area of greater intake air amount Ga for a certain engine speed Ne.

The injection frequency setting unit 431 changes the target injection frequency to "one time in the intake stroke" when it is determined by the cleaning determination unit 42 that the cleaning mode should be executed when the injectors 19 are driven in the divided injection mode. With this, the injection mode can be switched to the single injection mode regardless of the operation condition, and the multiple injectors 19 can be sequentially switched to the single injection mode. The injection frequency setting unit 431 maintains the target injection frequency to "one time in the intake stroke" even when the reference injection frequency determined based on the injection characteristic map becomes "multiple time in the intake stroke" after the cleaning determination unit 42 determines that the cleaning mode should be executed when the injectors 19 are driven in the divided injection mode. With this, switching to the divided injection mode can be prohibited regardless of the operation condition, and the single injection mode can be maintained. When the cleaning determination unit 42 does not determine that the cleaning mode should be executed, the injection frequency setting unit 431 sets the reference injection frequency as the target injection frequency.

The pump control unit 44 has a fuel pressure setting unit 441 that sets the target fuel pressure. The pump control unit 44 outputs control signals to the pump solenoids 25 so that that the actual fuel pressure becomes the target fuel pressure. The fuel pressure setting unit 441 first determines a reference fuel pressure Pf0 corresponding to the operation condition on the basis of a fuel pressure characteristic map or the like indicating fuel pressure characteristics stored in the memory 45 in advance. For example, the fuel pressure characteristic map is a characteristic map using the engine speed Ne and the intake air amount Ga as parameters and showing that the reference fuel pressure Pf0 becomes higher as the intake air amount Ga becomes greater for a certain engine speed Ne.

The fuel pressure setting unit 441 determines whether the injection mode of all of the injectors 19 has been switched to the single injection mode, specifically, whether a permission condition for the increasing fuel pressure (fuel pressure increase permission condition) has been satisfied, when it is determined by the cleaning determination unit 42 that the cleaning mode should be executed when the injectors 19 are driven in the divided injection mode. When it is determined that the injection mode of all of the injectors 19 has been switched to the single injection mode and that the fuel pressure increase permission condition has been satisfied, the fuel pressure setting unit 441 increases the target fuel pressure to the cleaning pressure Pf2. For example, the fuel pressure increase permission condition is satisfied when a predetermined time period Δt has elapsed after switching to the single injection mode has been started. For example, the predetermined time period Δt is set to a time period corresponding to one operation cycle.

The fuel pressure increase permission condition can be that the injector control unit 43 has controlled all of the injectors 19 to execute the single injection mode, instead of that the predetermined time period Δt has elapsed. Or, the fuel pressure increase permission condition can be that a predetermined number of rotations (for example, two rotations) of the crankshaft 6 has been detected by the crank angle sensor 31. The fuel pressure setting unit 441 sets the reference fuel pressure Pf0 as the target fuel pressure when the cleaning determination unit 42 does not determine that the cleaning mode should be executed. The predetermined time period Δt is counted not only when cleaning mode is executed, but also when the injection mode is switched from the divided injection mode to the single injection mode in a normal control (see a delay timer in FIG. 5).

Figure 3:
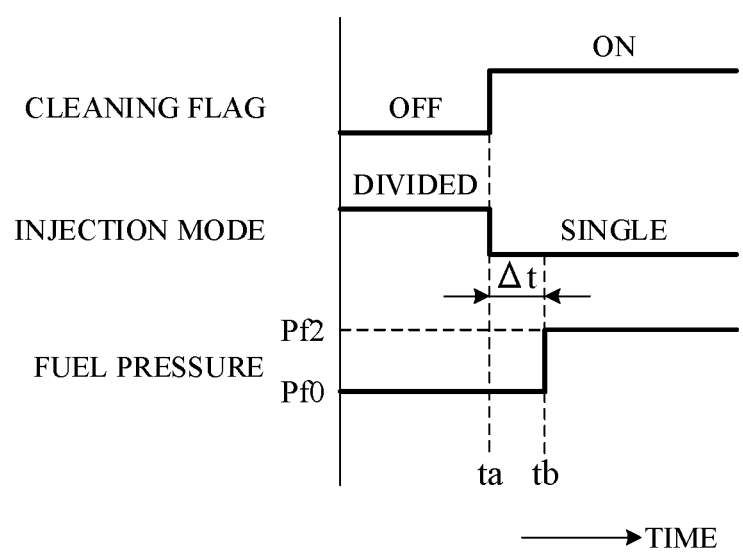
FIG. 3 is a time chart showing an example of main operations of the fuel injection apparatus according to the embodiment of the present invention.

FIG. 3 is a time chart showing an example of main operations of the fuel injection apparatus 100 according to the present embodiment. As shown in FIG. 3, in an initial state where a cleaning flag is off, the fuel is injected in the divided injection mode at the reference fuel pressure Pf0. In this condition, at a time point ta, it is determined that the cleaning mode should be executed (the cleaning flag is turned on) and the injection mode is switched to the single injection mode sequentially among the cylinders. Then, at a time point tb after a lapse of the predetermined time period Δt, the injection mode of the injectors 19 of all of the cylinders has been switched to the single injection mode and the fuel pressure is increased from the reference fuel pressure Pf0 to the cleaning pressure Pf2.

As seen above, it becomes possible to prevent injecting an excessive amount of fuel from the injectors 19 in a transition period for switching from the divided injection mode to the single injection mode, by setting or maintaining the target fuel pressure to the reference fuel pressure Pf0 until the injection mode of all of the injectors 19 has been switched to the single injection mode. With this, deviation of the actual air-fuel ratio from the target value can be suppressed. And thus, by increasing the fuel pressure to the cleaning pressure Pf2 after the injection mode of all of the injectors 19 has been switched to the single injection mode, it becomes possible to easily remove deposits adhering to the nozzles of the injectors 19 and to properly execute the cleaning mode.

Figure 4:
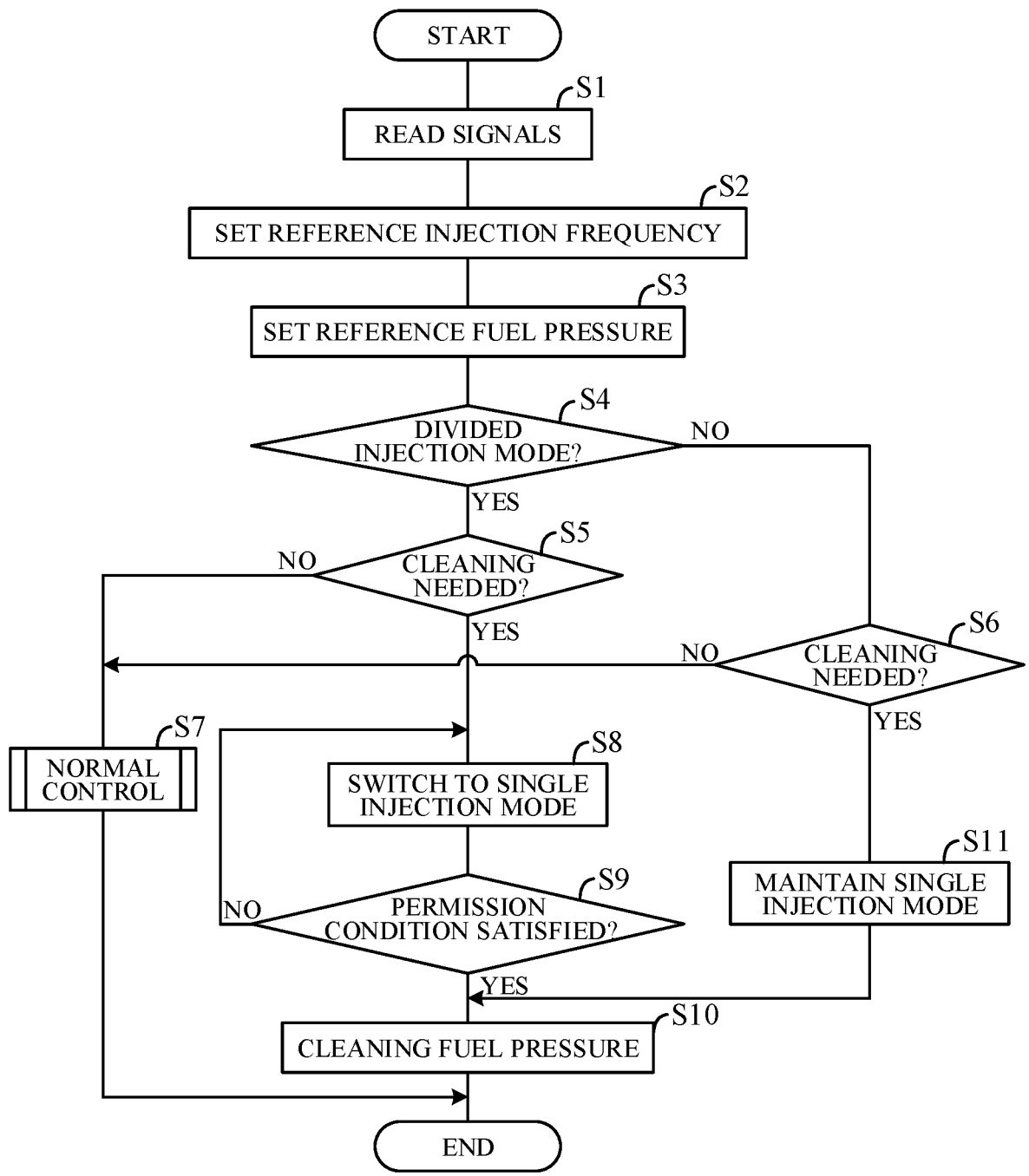
FIG. 4 is a flowchart showing an example of a process performed by a controller in FIG. 2.

FIG. 4 is a flowchart showing an example of a process performed by the processor 41 of the controller 40 in accordance with a program stored in the memory 45 in advance. For example, the process shown in this flowchart is started after start of the engine 1 and repeated in a predetermined cycle.

First, in S1 (S means a process step), the processor 41 reads signals from the sensors 31 to 34. Then, in S2, the processor 41 sets the reference injection frequency corresponding to the operation condition using a predetermined injection characteristic map or the like. Then, in S3, the processor 41 sets the reference fuel pressure Pf0 corresponding to the operation condition using a predetermined fuel pressure characteristic map or the like. Then, in S4, the processor 41 determines whether the injection mode is the divided injection mode. When the determination in S4 is YES, the process proceeds to S5; when the determination in S4 is NO, the process proceeds to S6.

In both S5 and S6, the processor 41 determines whether the cleaning mode should be executed on the basis of signals from the sensors 31 to 34. Specifically, it is determined whether the engine water temperature Tw detected by the water temperature sensor 33 is equal to or greater than the predetermined value Tw1, the intake air amount Ga detected by the airflow sensor 32 is equal to or greater than the predetermined value Ga1, the engine speed Ne detected by the crank angle sensor 31 is equal to or greater than the predetermined value Ne1, and the fuel pressure Pf detected by the fuel pressure sensor 34 is smaller than the predetermined value Pf1.

When the determination in S5 or S6 is NO, the processor 41 performs the normal control in S7. In the normal control, the processor 41 outputs control signals to the injectors 19 so that the injectors 19 inject the fuel at the reference injection frequency set in S2, as well as outputs control signals to the pump solenoids 25 so that the fuel pressure becomes the reference fuel pressure Pf0 set in S3, and terminates the process. In the normal control, the processor 41 starts counting the predetermined time period Δt every time when the injection mode is switched from the divided injection mode to the single injection mode.

When the determination in S5 is YES, the process proceeds to S8, the processor 41 sequentially outputs control signals to the injectors 19 so as to sequentially switch the injection mode to the single injection mode among the injectors 19, and changes the injection frequency of the injectors 19 to "one time in the intake stroke". Then, in S9, the processor 41 determines whether the injection mode of all of the injectors 19 has been switched to the single injection, specifically, whether the predetermined time period Δt has elapsed after the start of switching to the single injection mode and thus the fuel pressure increase permission condition has been satisfied. When the determination in S9 is NO, the process returns to S8. When the determination in S9 is YES, the process proceeds to S10, the processor 41 outputs control signals to the pump solenoids 25 so as to increase the fuel pressure to the cleaning pressure (cleaning fuel pressure) Pf2, and terminates the process.

On the other hand, when the determination in S6 is YES, the process proceeds to S11, the processor 41 maintains the single injection mode, and the process proceeds to S10. Specifically, the processor 41 maintains the cleaning mode and terminates the process.

Figure 5:
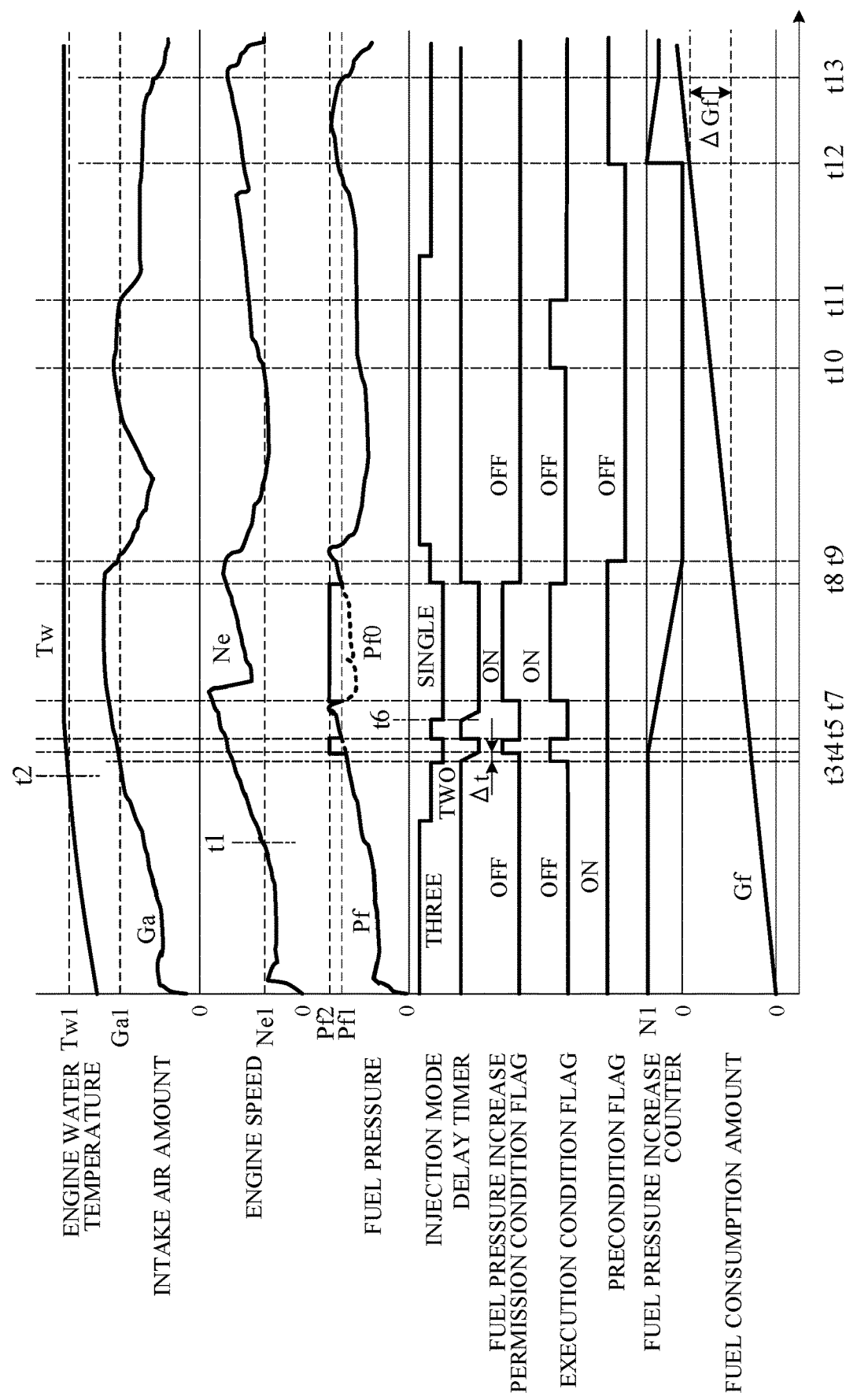
FIG. 5 is a time chart showing an example of a specific operation of the fuel injection apparatus according to the embodiment of the present invention.

FIG. 5 is a time chart showing an example of a specific operation of the fuel injection apparatus 100 according to the present embodiment. This time chart shows respective changes in the engine water temperature Tw, the intake air amount Ga, the engine speed Ne, the fuel pressure Pf, and the injection mode over time from the start of the engine 1. This time chart also shows whether the precondition, the execution condition, or the fuel pressure increase permission condition relating to execution of the cleaning mode has been satisfied, using ON and OFF of respective flags (a precondition flag, an execution condition flag, and a fuel pressure increase permission condition flag). FIG. 5 also shows a change in the delay timer for counting the predetermined time period Δt after switching to the single injection mode has been started, and respective changes in a fuel pressure increase counter and a fuel consumption amount Gf relating to whether the precondition has been satisfied. As the characteristics of the fuel pressure Pf, the actual fuel pressure is shown by a solid line and the reference fuel pressure Pf0 is shown by a dotted line.

As shown in FIG. 5, the engine water temperature Tw, the intake air amount Ga, the engine speed Ne, and the fuel pressure Pf respectively gradually increase after the start of the engine 1. The engine speed Ne becomes equal to or greater than the predetermined value Ne1 at a time point t1; the engine water temperature Tw becomes equal to or greater than the predetermined value Tw1 at a time point t2; and the intake air amount Ga becomes equal to or greater than the predetermined value Ga1 at a time point t3. Thus, since the fuel pressure Pf is smaller than the predetermined value Pf1, the execution condition becomes satisfied (the execution condition flag is turned on) at the time point t3. At this time, since the cleaning mode should be executed in the initial state after the start of the engine 1, the precondition has already been satisfied (the precondition flag has already been turned on). Therefore, since both of the precondition and the execution condition are satisfied at the time point t3, it is determined that the cleaning mode should be executed and the injection mode is switched from the divided injection mode to the single injection mode (S8).

When it is determined that the cleaning mode should be executed at the time point t3, the delay timer starts counting. When the delay timer has counted the predetermined time period Δt at a time point t4, the fuel pressure increase permission condition is satisfied (the fuel pressure increase permission condition flag is turned on), and the fuel pressure Pf is increased to the cleaning pressure Pf2 (S10). With this, it becomes possible to remove deposits adhering to the tips of the injectors 19 at the start of the engine 1 without causing deviation of the air-fuel ratio. In response to the start of increase in the fuel pressure at the time point t4, the fuel pressure increase counter starts counting a predetermined number N1 (counting a predetermined time period).

Then, at a time point t5, the fuel pressure Pf (the reference fuel pressure Pf0 represented by a dotted line) becomes equal to or greater than the predetermined value Pf1, the execution condition becomes unsatisfied (the execution condition flag is turned off), and the fuel pressure increase permission condition also becomes unsatisfied (the fuel pressure increase permission condition flag is turned off). As a result, execution of the cleaning mode is stopped, the operation mode is switched to the normal mode (normal control), and the target fuel pressure is reduced from the cleaning pressure Pf2 to the reference fuel pressure Pf0 (S7). At this time, the injection frequency becomes the reference injection frequency (two times in the intake stroke in FIG. 5), and the injection mode is switched from the single injection mode to the divided injection mode. Since the fuel pressure Pf after the time point t5 is equal to or greater than the predetermined value Pf1, which can contribute to removal of deposits, the fuel pressure increase counter continues counting.

At a time point t6, the reference injection frequency is changed to one time in the intake stroke in the normal control, and the injection mode is switched to the single injection mode. At this time, the delay timer starts counting the predetermined time period Δt. Then, at a time point t7, the reference fuel pressure Pf0 becomes smaller than the predetermined value Pf1, and the execution condition is satisfied again. At this time, since the delay timer has already counted the predetermined time period Δt after the time point t6, the fuel pressure increase permission condition is satisfied simultaneously. Accordingly, at the time point t7, the cleaning mode is started and the fuel pressure Pf is increased to the cleaning pressure Pf2 (S10). Hereafter, during execution of cleaning mode, switching to the divided injection mode is prohibited even when the reference injection frequency corresponding to the operation condition becomes multiple times in the intake stroke.

At a time point t8, the reference fuel pressure Pf0 becomes equal to or greater than the predetermined value Pf1, the execution condition becomes unsatisfied again, and the fuel pressure increase permission condition also becomes unsatisfied. As a result, the operation mode is switched to the normal mode (normal control) and the target fuel pressure is reduced from the cleaning pressure Pf2 to the reference fuel pressure Pf0 (S7). At this time, the injection frequency becomes the reference injection frequency (two times in the intake stroke in FIG. 5), and the injection mode is switched from the single injection mode to the divided injection mode.

Then, at a time point t9, the fuel pressure increase counter has counted the predetermined number N1 and, since a sufficient time period has elapsed with the fuel pressure being equal to or greater than the predetermined value Pf1, it is determined that the tips of the injectors 19 have been sufficiently cleaned. Therefore, since removal of deposits is not needed, the precondition becomes unsatisfied (the precondition flag is turned off). In this condition, even when the engine water temperature Tw is equal to or greater than the predetermined value Tw1, the intake air amount Ga is equal to or greater than the predetermined value Ga1, the engine speed Ne is equal to or greater than the predetermined value Ne1, and the fuel pressure Pf is smaller than the predetermined value Pf1, for example, from a time point t10 to a time point t11 and thus the execution condition is satisfied, the cleaning mode is not executed and the injection frequency and the fuel pressure are controlled in the normal control.

At a time point t12, the fuel consumption amount Gf (cumulative amount) after the time point t9, at which the fuel pressure increase counter has become zero, reaches a predetermined value ΔGf, it is determined that removal of deposits is needed, and the precondition is satisfied again (the precondition flag is turned on). However, in FIG. 5, at the time point t12, since the intake air amount Ga is smaller than the predetermined value Ga1 and the fuel pressure Pf is equal to or greater than the predetermined value Pf1, the execution condition is not satisfied (the execution condition flag is off) and the operation mode is not switched to the cleaning mode. At the time point t12, since the fuel pressure Pf is equal to or greater than the predetermined value Pf1, the fuel pressure increase counter starts counting the predetermined number N1, while, at a time point t13, the fuel pressure Pf becomes smaller than the predetermined value Pf1 and therefore the fuel pressure increase counter stops counting.

The present embodiment can achieve advantages and effects such as the following:

(1) The fuel injection apparatus 100 for injecting the fuel to the engine 1 having the multiple cylinders includes: the multiple injectors 19 disposed so as to be associated with the multiple cylinders; the high-pressure pumps 23 for regulating the pressure of the fuel supplied to the injectors 19; the cleaning determination unit 42 for determining whether to start deposits removal operation for removing deposits adhering to the nozzles of the injectors 19, specifically, whether to start executing the cleaning mode; the injector control unit 43 and the pump control unit 44 for controlling the injectors 19 and the high-pressure pumps 23 (pump solenoids 25) so as to execute one of the single injection mode, in which the fuel is injected one time in one cycle, and the divided injection mode, in which the fuel is injected multiple times in one cycle, in accordance with the operation condition of the engine 1 (FIG. 1 and FIG. 2). The injector control unit 43 controls the injectors 19 so as to execute the single injection mode when it is determined that the cleaning mode should be executed when controlling the injectors 19 so as to execute the divided injection mode in accordance with the operation condition of the engine 1. Thereafter, the pump control unit 44 controls the high-pressure pump 23 so that the fuel pressure increases (FIG. 3).

With this configuration, it becomes possible to suppress deviation of the actual air-fuel ratio from the target air-fuel ratio in the transition period for switching the injection mode from the divided injection mode to the single injection mode. It also becomes possible to properly remove deposits by increasing the fuel pressure after switching to the single injection mode.

(2) The pump control unit 44 controls the high-pressure pump 23 so as to increase the fuel pressure, when the predetermined time period Δt has elapsed after starting controlling the injectors 19 to execute the single injection in response to determination to start executing the cleaning mode. With this, it becomes possible to increase the fuel pressure at an optimum timing without causing deviation of the air-fuel ratio.

(3) The pump control unit 44 can also control the high-pressure pump 23 so as to increase the fuel pressure, when all of the injectors 19 are in the single injection mode after starting controlling the injectors 19 so as to sequentially execute the single injection mode in response to determination to start executing the cleaning mode. With this, it becomes possible to reliably prevent executing the cleaning mode in such a manner to cause deviation of the air-fuel ratio.

(4) The pump control unit 44 controls the high-pressure pump 23 so as to prohibit executing the divided injection mode and to increase the fuel pressure immediately without waiting for a lapse of the predetermined time period Δt (before the predetermined time period Δt has elapsed), when it is determined that execution of the cleaning mode should be started when the injectors 19 are controlled so as to execute the single injection mode. With this, it becomes possible to immediately remove the deposits when removal of the deposits is needed during operating in the single injection mode.

The above embodiment can be modified into various forms. Hereafter, modifications will be described. While, in the above embodiment, the engine 1 is configured to have the cylinder-injection injectors 19 (fuel injection valves) disposed so as to be associated with the multiple cylinders, an internal combustion engine can have port-injection fuel injection valves that inject the fuel to the intake passage, in addition to the cylinder-injection fuel injection valves. While, in the above embodiment, the pressure of the fuel supplied to the injectors 19 is regulated by the high-pressure pump 23, a pressure controller can be configured otherwise.

While, in the above embodiment, the cleaning determination unit 42 determines whether the precondition is satisfied and whether the execution condition is satisfied, and decides to start executing the cleaning mode, which is a deposit removal operation to remove deposits adhering to the nozzles of the injectors 19, when the both conditions are satisfied simultaneously. However, a deposit removal decision unit may be configured otherwise. For example, it can be configured to detect amount of deposits by a sensor or the like, and to decide to start the deposit removal operation when the amount of deposits exceeds a predetermined amount.

While, in the above embodiment, the injector control unit 43 controls the injectors 19 so as to execute the single injection mode when it is determined that execution of the cleaning mode should be started when the injectors 19 are controlled so as to execute the divided injection mode in accordance with the operation condition of the engine 1. And thereafter, the pump control unit 44 controls the high-pressure pump 23 so as to increase the fuel pressure to the cleaning pressure when the predetermined time period Δt has elapsed or when all of the injectors 19 execute the single injection mode. However, an operation controller may be configured otherwise. For example, it can be configured to reduce the injection frequency in the divided injection mode instead of executing the single injection mode when it is determined that execution of the cleaning mode should be started. It can also be configured to prohibit increasing the injection frequency and to control the high-pressure pump 23 so as to increase the fuel pressure immediately when it is determined that execution of the cleaning mode should be started when controlling the injectors 19 so as to reduce the injection frequency in the divided injection mode. Specifically, the operation controller may have any configuration as long as controlling the fuel injection valves so as to reduce at least the injection frequency and then controlling the pressure controller so as to increase the fuel pressure when it is determined that the deposit removal operation should be started when the divided injection mode is executed in accordance with the operation condition.

The present invention can be also used as a fuel injection method for injecting fuel to an internal combustion engine having multiple cylinders.

The above embodiment can be combined as desired with one or more of the above modifications. The modifications can also be combined with one another.

According to the present invention, it becomes possible to properly remove the deposits without causing deviation of the actual air-fuel ratio from the target air-fuel ratio.

Above, while the present invention has been described with reference to the preferred embodiments thereof, it will be understood, by those skilled in the art, that various changes and modifications may be made thereto without departing from the scope of the appended claims.

What is claimed is:

1. A fuel injection apparatus configured to inject fuel to an internal combustion engine having a plurality of cylinders, the fuel injection apparatus comprising:
   a plurality of fuel injectors disposed corresponding to the plurality of cylinders;
   a pressure regulator configured to regulate a pressure of fuel supplied to the plurality of fuel injectors; and
   an electronic control unit having a processor and a memory connected to the processor, wherein
   the processor is configured to perform:
      deciding to start a deposit removal operation for removing deposits adhering to nozzles of the plurality of fuel injectors; and
      controlling each of the plurality of fuel injectors to inject fuel in one of a single injection mode for injecting fuel one time in one combustion cycle and a divided injection mode for injecting fuel multiple times in the one combustion cycle, and controlling the pressure regulator based on an operation condition of the internal combustion engine, wherein
the processor is configured to perform:
the controlling including, in a case of controlling the each of the plurality of fuel injectors to inject fuel in the divided injection mode based on the operation condition of the internal combustion engine, sequentially controlling the each of the plurality of fuel injectors to reduce a number of injections in the one combustion cycle when the deposit removal operation is decided to be started, and then controlling the pressure regulator to increase the pressure of fuel when a predetermined time period corresponding to the one combustion cycle has elapsed from a start of controlling sequentially the each of the plurality of fuel injectors to reduce the number of injections.

2. The fuel injection apparatus according to claim 1, wherein
the predetermined time period is a time required for reducing the number of injections of all of the plurality of fuel injectors.

3. The fuel injection apparatus according to claim 1, wherein
the processor is configured to perform:
the controlling including, in the case of controlling the each of the plurality of fuel injectors to inject fuel in the divided injection mode based on the operation condition of the internal combustion engine, sequentially controlling the each of the plurality of fuel injectors to inject fuel in the single injection mode when the deposit removal operation is decided to be started.

4. The fuel injection apparatus according to claim 1, wherein
the processor is configured to perform:
the controlling including, in the case of controlling the each of the plurality of fuel injectors to reduce the number of injections, prohibiting increasing the number of injections, and controlling the pressure regulator to increase the pressure of fuel when the deposit removal operation is decided to be started.

5. The fuel injection apparatus according to claim 3, wherein
the processor is configured to perform:
the controlling including, in the case of controlling the each of the plurality of fuel injectors to inject fuel in the single injection mode, prohibiting injecting fuel in the divided injection mode, and controlling the pressure regulator to increase the pressure of fuel when the deposit removal operation is decided to be started.

6. The fuel injection apparatus according to claim 1, wherein
the processor is configured to perform:
the deciding including determining whether to execute a cleaning mode; and
the controlling including, in the case of controlling the each of the plurality of fuel injectors to inject fuel in the divided injection mode based on the operation condition of the internal combustion engine in a normal mode, switching an operation mode from the normal mode to the cleaning mode and sequentially controlling the each of the plurality of fuel injectors to reduce the number of injections in the cleaning mode when the cleaning mode is determined to be executed, and controlling the pressure regulator to increase the pressure of fuel when the predetermined time period has elapsed from the start of controlling sequentially the each of the plurality of fuel injectors to reduce the number of injections.

7. The fuel injection apparatus according to claim 6, further comprising:
a pressure detector configured to detect the pressure of fuel, wherein
the processor is configured to perform:
the determining including determining to execute the cleaning mode when a first condition is determined to be satisfied and a second condition is determined to be satisfied, wherein
the first condition is satisfied every time when a predetermined amount of fuel has been consumed after the cleaning mode has been completed, and is unsatisfied when the cleaning mode has been continuously executed for a predetermined time period, wherein
the second condition is satisfied when the pressure of fuel detected by the pressure detector is lower than a first predetermined value, wherein
the processor is configured to perform:
the controlling including sequentially controlling the each of the plurality of fuel injectors to reduce the number of injections when the cleaning mode is determined to be executed, and controlling the pressure regulator to increase the pressure of fuel to a second predetermined value higher than the first predetermined value when the predetermined time period has elapsed from the start of controlling sequentially the each of the plurality of fuel injectors to reduce the number of injections.

8. A fuel injection apparatus configured to inject fuel to an internal combustion engine having a plurality of cylinders, the fuel injection apparatus comprising:
a plurality of fuel injectors disposed corresponding to the plurality of cylinders;
a pressure regulator configured to regulate a pressure of fuel supplied to the plurality of fuel injectors; and
an electronic control unit having a processor and a memory connected to the processor, wherein
the processor is configured to function as:
a deposit removal decision unit configured to decide to start a deposit removal operation for removing deposits adhering to nozzles of the plurality of fuel injectors; and
an operation control unit configured to control each of the plurality of fuel injectors to inject fuel in one of a single injection mode for injecting fuel one time in one combustion cycle and a divided injection mode for injecting fuel multiple times in the one combustion cycle, and to control the pressure regulator based on an operation condition of the internal combustion engine, wherein
the operation control unit is configured, in a case of controlling the each of the plurality of fuel injectors to inject fuel in the divided injection mode based on the operation condition of the internal combustion engine, to sequentially control the each of the plurality of fuel injectors to reduce a number of injections in the one combustion cycle when the deposit removal decision unit decides to start the deposit removal operation, and to control the pressure regulator to increase the pressure of fuel when a predetermined time period corresponding to the one combustion cycle has elapsed from a start of controlling sequentially the each of the plurality of fuel injectors to reduce the number of injections.

9. The fuel injection apparatus according to claim 8, wherein
the predetermined time period is a time required for reducing the number of injections of all of the plurality of fuel injectors.

10. The fuel injection apparatus according to claim 8, wherein
the operation control unit is configured, in the case of controlling the each of the plurality of fuel injectors to inject fuel in the divided injection mode based on the operation condition of the internal combustion engine, to sequentially control the each of the plurality of fuel injectors to inject fuel in the single injection mode when the deposit removal decision unit decides to start the deposit removal operation.

11. The fuel injection apparatus according to claim 8, wherein
the operation control unit is configured, in the case of controlling the each of the plurality of fuel injectors to reduce the number of injections, to prohibit increasing the number of injections, and to control the pressure regulator to increase the pressure of fuel when the deposit removal decision unit decides to start the deposit removal operation.

12. The fuel injection apparatus according to claim 10, wherein
the operation control unit is configured, in the case of controlling the each of the plurality of fuel injectors to inject fuel in the single injection mode, to prohibit injecting fuel in the divided injection mode, and to control the pressure regulator to increase the pressure of fuel when the deposit removal decision unit decides to start the deposit removal operation.

13. The fuel injection apparatus according to claim 8, wherein
the deposit removal decision unit is configured to function as a cleaning determination unit configured to determine whether to execute a cleaning mode, wherein
the operation control unit is configured, in the case of controlling the each of the plurality of fuel injectors to inject fuel in the divided injection mode based on the operation condition of the internal combustion engine in a normal mode, to switch an operation mode from the normal mode to the cleaning mode and to sequentially control the each of the plurality of fuel injectors to reduce the number of injections in the cleaning mode when the cleaning determination unit determines to execute the cleaning mode, and to control the pressure regulator to increase the pressure of fuel when the predetermined time period has elapsed from the start of controlling sequentially the each of the plurality of fuel injectors to reduce the number of injections.

14. The fuel injection apparatus according to claim 13, further comprising:
a pressure detector configured to detect the pressure of fuel, wherein
the cleaning determination unit is configured to determine to execute the cleaning mode when a first condition is determined to be satisfied and a second condition is determined to be satisfied, wherein
the first condition is satisfied every time when a predetermined amount of fuel has been consumed after the cleaning mode has been completed, and is unsatisfied when the cleaning mode has been continuously executed for a predetermined time period, wherein
the second condition is satisfied when the pressure of fuel detected by the pressure detector is lower than a first predetermined value, wherein
the operation control unit is configured to sequentially control the each of the plurality of fuel injectors to reduce the number of injections when the cleaning determination unit determines to execute the cleaning mode, and to control the pressure regulator to increase the pressure of fuel to a second predetermined value higher than the first predetermined value when the predetermined time period has elapsed from the start of controlling sequentially the each of the plurality of fuel injectors to reduce the number of injections.

15. A fuel injection method for injecting fuel to an internal combustion engine having a plurality of cylinders, a plurality of fuel injectors disposed corresponding to the plurality of cylinders, and a pressure regulator configured to regulate a pressure of fuel supplied to the plurality of fuel injectors, the fuel injection method comprising:
deciding to start a deposit removal operation for removing deposits adhering to nozzles of the plurality of fuel injectors; and
controlling each of the plurality of fuel injectors to inject fuel in one of a single injection mode for injecting fuel one time in one combustion cycle and a divided injection mode for injecting fuel multiple times in the one combustion cycle, and controlling the pressure regulator based on an operation condition of the internal combustion engine, wherein
the controlling including, in a case of controlling the each of the plurality of fuel injectors to inject fuel in the divided injection mode based on the operation condition of the internal combustion engine, sequentially controlling the each of the plurality of fuel injectors to reduce a number of injections in the one combustion cycle when the deposit removal operation is decided to be started, and controlling the pressure regulator to increase the pressure of fuel when a predetermined time period corresponding to the one combustion cycle has elapsed from a start of controlling sequentially the each of the plurality of fuel injectors to reduce the number of injections.

* * * * *